(12) United States Patent
Purple

(10) Patent No.: US 6,252,587 B1
(45) Date of Patent: Jun. 26, 2001

(54) METHOD AND APPARATUS IN A DATA PROCESSING SYSTEM FOR ACCESSING DATA

(75) Inventor: Lance Jeffery Purple, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/137,771

(22) Filed: Aug. 20, 1998

(51) Int. Cl.[7] .................................................. G06F 3/00
(52) U.S. Cl. ....................................... 345/326; 717/2
(58) Field of Search ................................ 345/326, 333, 345/335, 339, 966; 707/10, 104, 501, 513; 709/201, 203, 217, 219; 717/1, 2, 5, 8

(56) References Cited

U.S. PATENT DOCUMENTS

| | | | |
|---|---|---|---|
| 5,627,979 | * | 5/1997 | Chang et al. .................... 345/335 |
| 5,708,828 | * | 1/1998 | Coleman ............................ 707/523 |
| 5,710,901 | * | 1/1998 | Stodghill et al. ................... 345/339 |
| 5,956,730 | * | 7/1999 | Burroughs et al. ................ 707/104 |
| 6,070,006 | * | 5/2000 | Iriuchijima et al. ................. 717/1 |
| 6,075,529 | * | 6/2000 | Tamegaya .......................... 345/335 |

\* cited by examiner

Primary Examiner—Crescelle N. dela Torre
(74) Attorney, Agent, or Firm—Duke W. Yee; David A. Mims

(57) ABSTRACT

A method in a data processing system for reading data having a non-standard format. A graphical user interface is displayed, wherein a user interacts with the graphical user interface to enter the format of the data to be read. The format of the data to be read is received through the graphical user interface. Code is generated to read the data using the format of the data.

28 Claims, 6 Drawing Sheets

METHOD AND APPARATUS IN A DATA PROCESSING SYSTEM FOR ACCESSING DATA

BACKGROUND OF THE INVENTION

1. Technical Field

The present invention relates generally to an improved data processing system, and in particular to an improved method and apparatus for accessing data. Still more particularly, the present invention provides a method and apparatus for accessing data stored in a legacy data format.

2. Description of Related Art

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of modern state-of-the-art data processing system often become overwhelming in magnitude and complexity. The amount of data available to a user has increased with the Internet. The Internet, also referred to as an "internetwork", in communications is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed method of transferring data over the Internet is to employ the World Wide Web environment, also called simply "the web". Other Internet resources exist for transferring information, such as File Transfer Protocol (FTP) and Gopher, but have not achieved the popularity of the web. In the web environment, servers and clients effect data transaction using the Hypertext Transfer Protocol (HTTP), in known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other web resources identified by a Uniform Resource Locator (URL). A URL is a special syntax identifier defining a communications path to specific information. Each logical block of information accessible to a client, called a "page" or a "web page", is identified by a URL. The URL provides a universal, consistent method for finding and accessing this information by the web "browser". A browser is a program capable of submitting a request for information identified by a URL at the client machine. Retrieval of information on the web is generally accomplished with an HTML-compatible browser, such as, for example, Netscape Communicator, which is available from Netscape Communications Corporation.

When a user desires to retrieve a document, such as a web page, a request is submitted to a server connected to a client computer at which the user is located and may be handled by a series of servers to effect retrieval of the requested information. The selection of a document is typically performed by the user selecting a hypertext link. The hypertext link is typically displayed by the browser on a client as a highlighted word or phrase within the document being viewed with the browser. The browser then issues a hypertext transfer protocol (HTTP) request for the requested documents to the server identified by the requested document's URL. The server then returns the requested document to the client browser using the HTTP. The information in the document is provided to the client formatted according to HTML. Typically, browsers on personal computers (PCs) along with workstations are typically used to access the Internet. The standard HTML syntax of Web pages and the standard communication protocol (HTTP) supported by the World Wide Web guarantee that any browser can communicate with any web server.

Often applications or programs may be sent to a computer from a web server across the Internet. Java applications are becoming increasingly more prevalent as the type of application sent between web servers and client computers. The Java programming language and Java applets provides platform—independent application programs over the Internet and the World Wide Web. Programs written in the Java language can be executed on any computer platform having a Java interpreter. In addition, the integrity of programs written in Java may be verified prior to their execution. Java applications are common on the Internet and becoming more increasingly common in intranets and in other types of networks used in businesses.

With the increasing use of Java applications, an incompatibility between these applications and data formatted for other types of operating environments has arisen. Data formatted for other environments are often not accessible by because Java classes necessary to read the data in these formats are absent. A need exists to access data stored in legacy data formats, which is data stored in a format not normally supported by a newer operating environment. For example in Java, data stored a format not supported by Java is considered a legacy data format. Legacy data is data stored in a format, which was convenient for use by an older data processing program (a "legacy application"), but which does not have widespread acceptance as a standard format. Thus, the data requires conversion in order to be used by applications other than the original "legacy application". Access to data in a legacy format is desirable to make data more easily available. For example, the data may be accessed by a Java applet in a web browser. Typically, a user will know the basic structure of the data, but does not having available job classes that are capable of reading the data. In addition, the user may not have the time or expertise to write the necessary Java reader tools from scratch.

Therefore, it would be advantageous to have an improved method and apparatus for accessing data in a legacy data format.

SUMMARY OF THE INVENTION

The present invention provides a method in a data processing system for reading data having a non-standard format. A graphical user interface is displayed, wherein a user interacts with the graphical user interface to enter the format of the data to be read. The format of the data to be read is received through the graphical user interface. Code is generated to read the data using the format of the data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
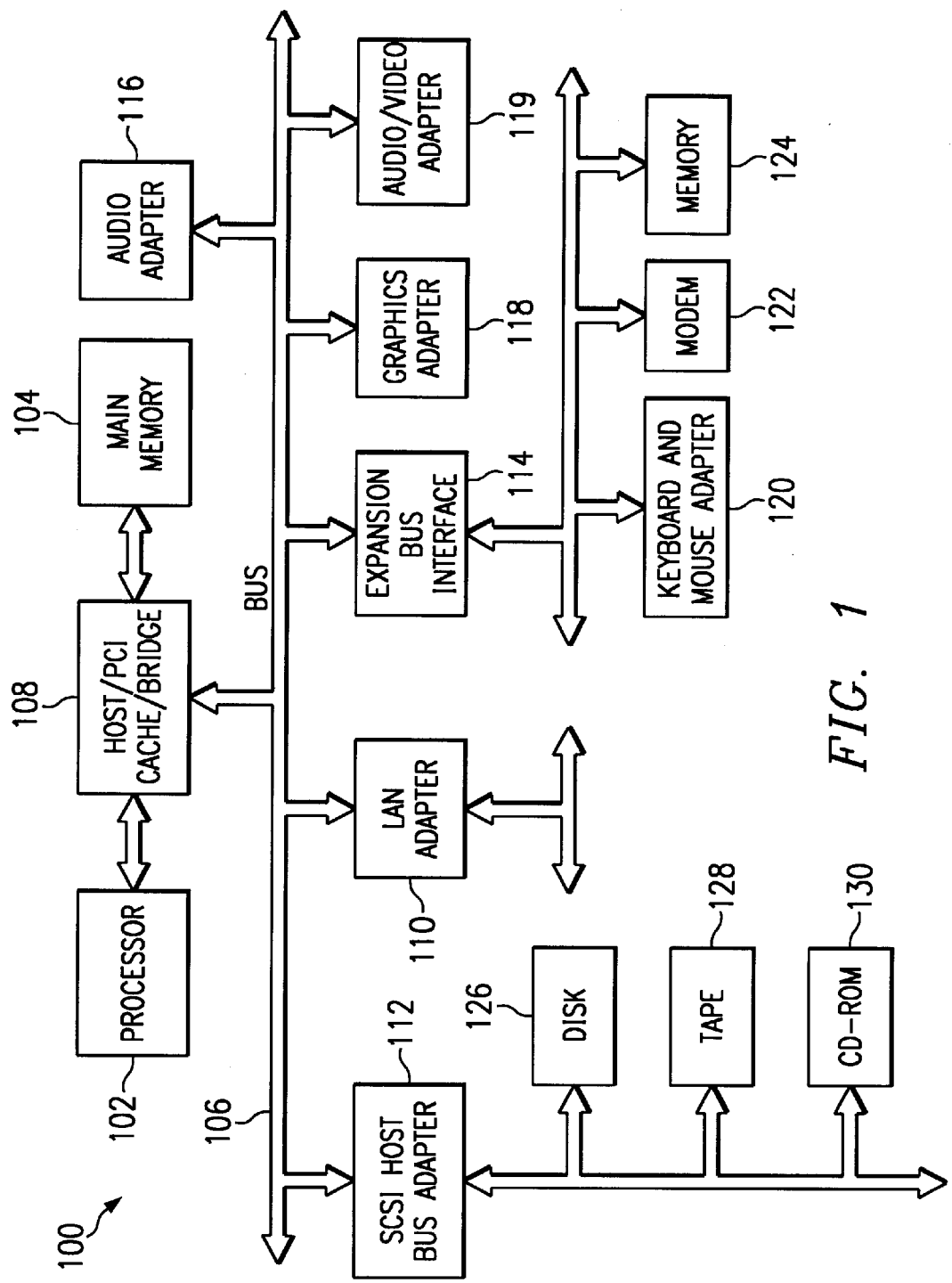
FIG. 1 is a block diagram of a data processing system in which the present invention may be implemented.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of from International Business Machines Corporation. An object oriented programming system such as Java may run in conjunction with the operating system and provides calls to the operating system from Java programs or applications executing on data processing system 100. Instructions for the operating system, the object-oriented operating system, and applications or programs are located on storage devices, such as hard disk drive 126 and may be loaded into main memory 104 for execution by processor 102.

Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

The present invention provides a system, method, and computer readable medium for allowing a user to describe a data format through a graphical user interface (GUI). The present invention takes the description of the data format provided described by the user to generate one or more Java classes that are capable of reading the data in the described data format. In particular, a Java bean is generated in response to user input received at the GUI in which the user input describes the format of the data. In this manner, Java beans are created that can read data streams encoded in a legacy data format. The GUI allows users, such as, for example, developers or programmers, to describe existing data formats and generate a new bean that is capable of reading the data format.

In the depicted example, the processes of the present invention may be implemented in a builder tool, called "BeanExtender" available from International Business Machine Corporation. BeanExtender builds and enhances JavaBeans components, which are "write once, run everywhere" components. BeanExtender offers dynamic behavior modification, customization, and enhancement of existing Java beans without the need for Java source code; eased development and use of Java Bean's behaviors and policies; and advanced Java Beans scripting, aggregation, management, and network deployment capabilities. BeanExtender is based on JavaSoft's JDK 1.1.1, which is available from Sun Microsystems, Inc. The depicted examples are described in relation to the implementation of these processes in the builder tool BeanExtender.

Figure 2:
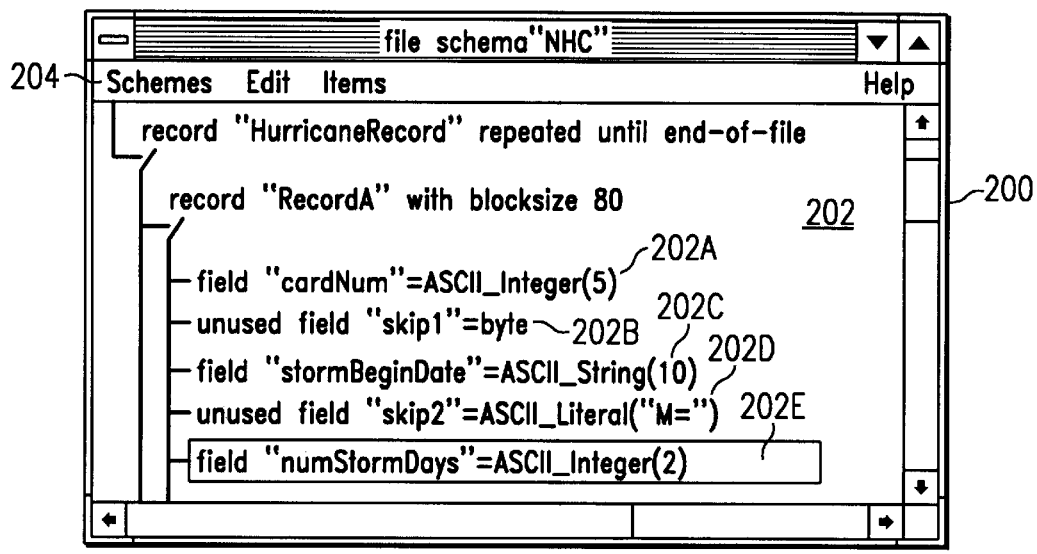
FIG. 2 is a window in a GUI with a file schema in accordance with a preferred embodiment of the present invention.

Turning now to FIGS. 2–6, diagrams illustrating the GUI employed to generate a bean used to read a legacy data format is depicted in accordance with a preferred embodiment of the present invention. In FIG. 2, a window 200 in a GUI is shown with a file schema 202. A file schema is used to describe the structure within a collection of data, such as a file, database, or communications data stream. File schema 202 contains a collection of schema records 202a–202e that describe the actual details of the data format. Different file schemas may be created using schema menu 204 in window 200. To generate a reader class for a file schema, the user may select a Generate command (not shown) from schema menu 204. In response, Java source code for a set of reader classes to be emitted and compiled to form a bean. In the depicted example, each source code file will be named <Item>Reader.java, where Item is the name of the file schema or schema record used to generate that reader class. The source code files and the resulting class files are placed in the package subdirectory com/ibm/beans/tools/dataFormatWizard/readers of the current working directory, defined in the BeanSystemProperties class for the builder tool BeanExtender.

Figure 3:
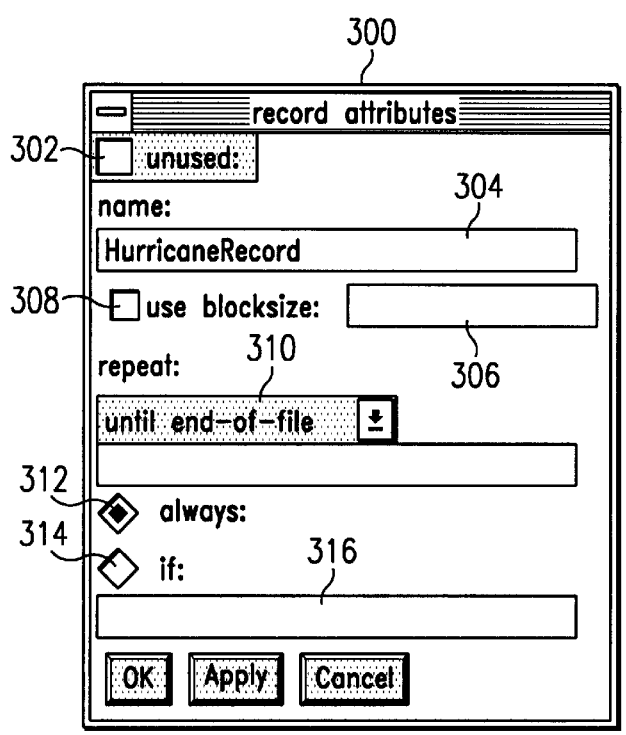
FIG. 3 is a record attributes dialog is displayed in accordance with a preferred embodiment of the present invention.

Turning now to FIG. 3, a record attributes dialog is displayed in accordance with a preferred embodiment of the present invention. A schema record is used to describe a structure of a set of fields and subrecords within a file schema. Record attributes dialog 300 provides a GUI to set properties for a schema record. These properties include, for example: "unused", "name", "blocksize", "repeated", and "if". These properties describe a basic set of information, such as a numeric value, a text string, or a constant value contained within a file schema. These schema record properties are described in more detail below.

The property "unused" is a property that may be set by selecting field 302 that when set, indicates that the schema record contains unused data. The reader classes read data from an input stream, but will not store the data or provide an accessor methods to access the data. Access or methods are provided by the generated Java reader classes to access the data read from the data stream containing legacy data.

The "name" property of the schema record is defined in name field 304. In the depicted example, the record name is unique within the file schema. This name is used to generate a Java reader class for the schema. If this name is not a valid Java class identifier, it is converted into a valid Java class identifier. Embedded blanks will be removed, and invalid characters are converted to "x" characters. "HurricaneRecord" is the name of the schema record for which attributes are shown in FIG. 3. The "blocksize" property is set in blocksize field 306. This property may be set by selecting field 308. If this property is set, then the reader classes always read the number of bytes set in blocksize field 306 when processing this record. Any of the bytes not used by the fields and subrecords of this record are ignored.

Next, the "repeated" property may be set in repeat field 310. This property determines whether the record is expected to appear once or multiple times within the data stream. In the depicted example, the "repeated" property can have the following values in field 310:

Once

The record is expected to appear exactly once. This value is the default value.

N Times

The record is expected to appear N times, where N is defined by a Java expression. The expression can use constant values or can refer to the values of other fields in the schema. To refer to values of other field in a schema, it uses their get accessor methods.

While X

The record is expected to appear an arbitrary number of times while condition X is true. X is defined by a Java expression that can use constant values or can refer to the values of other schema fields. To refer to a value of other schema fields, it uses their get accessor methods.

Until X

The record is expected to appear an arbitrary number of times, but at least once, until condition X is true. X is defined by a Java expression that can use constant values or can refer to the values of other fields. To refer to a value of other schema fields, it uses their get accessor methods.

Until End-Of-Block

The record is expected to appear an arbitrary number of times until the end of the current block is reached. This value is not valid unless this record is contained within another record that defines the block size.

Until End-Of-File

The record is expected to appear an arbitrary number of times until the end of the input stream is reached.

The "if" property determines whether a record is always expected to appear in the data stream or only under certain conditions. If the record is not always expected, a boolean Java expression is supplied, using constants or other schema values, to determine when the record should be expected. By default, the record is expected to appear in the data stream. This property is determined by selecting "always" 312 or "if" 314. The condition is entered into field 316 when "if" 314 is selected. In FIG. 3, "always" 312 is selected.

Figure 4:
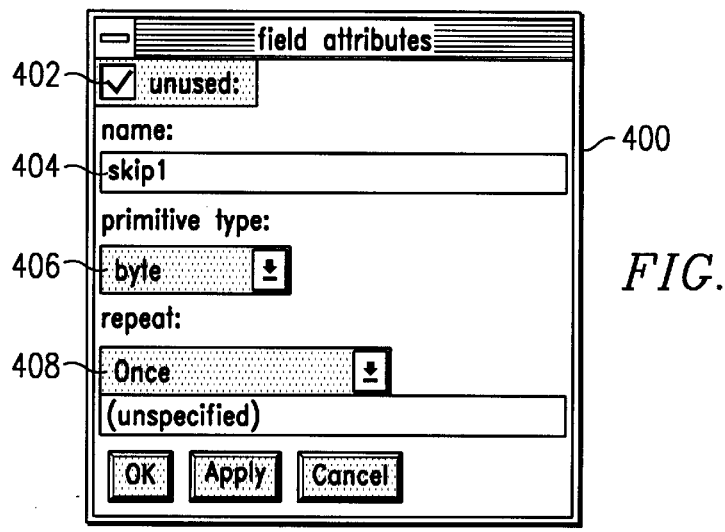
FIG. 4 is depiction of a primitive field attributes dialog in accordance in accordance with a preferred embodiment of the present invention.

Next, FIG. 4 illustrates a primitive field attributes dialog in accordance with a preferred embodiment of the present invention. A primitive field is a schema field that can be interpreted as a Java primitive type, such as a single byte or single floating-point value. The reader class uses one of the predefined methods in class java.io.DataInputStream to read the value and to define the get accessor method that returns the specified Java primitive type.

In primitive field attributes dialog 400, a primitive field may have one of the following properties: "unused", "name", "primitive type", or "repeated". These are properties that may be set within primitive field attributes dialog 400. The property "unused", may be used by selecting field 402, which is indicated by a "check mark" in the depicted example. If the "unused" property is set, the primitive field represents unused data. The reader class reads the data from an input stream, but it does not store this data or provide any get accessor methods to access it. The "name" property is set in name field 404. The name of the primitive field is entered into name field 404. This field name is unique within the parent schema record in the depicted example. This name is used to declare a field within a Java reader class for the parent schema record. If the specified name is not a valid Java field identifier, it is converted into one. Embedded blanks are removed and invalid characters are converted to "x" characters. The value of name field 404 is "skip1" in this example. The "primitive type" property is set in primitive type field 406 and indicates the type of the primitive field. This property may have one of the following values in the depicted example: byte, boolean, character, double, float, integer, and short. In field attributes dialog 400, the primitive type is "byte".

The property repeated is set in repeat field 408. This property determines whether the field is expected to appear once or multiple times in the data stream. This property may have one of the following values in the depicted example:

Once

The field is expected to appear exactly once. This is the default setting.

N Times

The field is expected to appear N times, where N is defined by a Java expression. The expression can use constant values or can refer to the values of other fields in the schema. To refer to values of other fields in a schema, it uses their get accessor methods.

While X

The field is expected to appear an arbitrary number of times while condition X is true. x is defined by a Java expression that can use constant values or can refer to the values of other schema fields. To refer to a value of other schema fields, it uses their get accessor methods.

Until X

The field is expected to appear an arbitrary number of times, but at least once, until condition X is true. X is defined by a Java expression that can use constant values or can refer to the values of other fields. To refer to a value of other schema fields, it uses their get accessor methods.

Until End-Of-Block

The field is expected to appear an arbitrary number of times until the end of the current block is reached. This value is not valid unless this record is contained within another record that defines the block size.

Until End-Of-File

The field is expected to appear an arbitrary number of times until the end of the input stream is reached.

Figure 5:
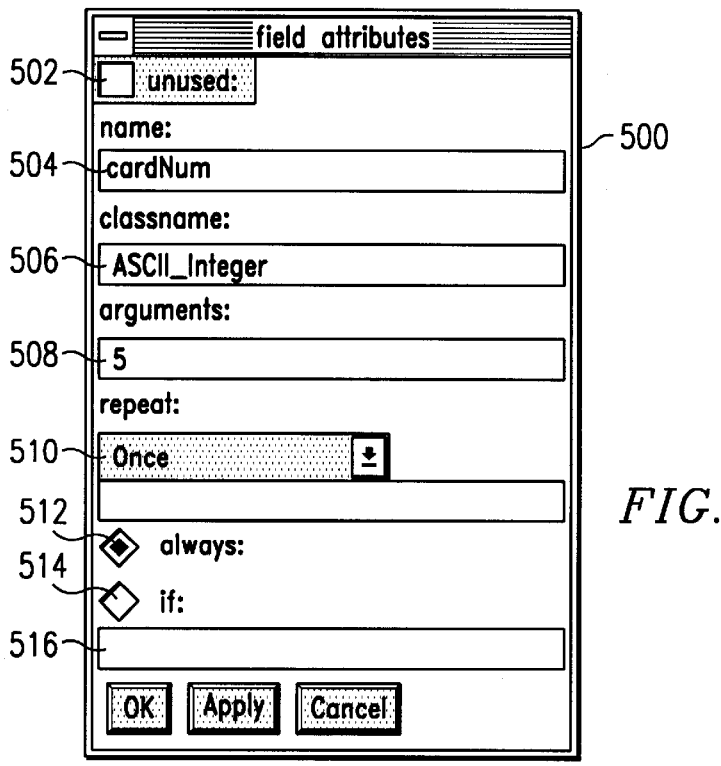
FIG. 5 is an illustration of a class field dialog in accordance with a preferred embodiment of the present invention.

Turning now to FIG. 5, a class field dialog is depicted in accordance with a preferred embodiment of the present invention. A class field is a schema field that is managed by a separate Java class. For example, the ASCII_Integer class in the ibm.beans.tools.dataFormatWizard.readers package reads a series of ASCII digits and automatically converts them to an integer value. Class field dialog 500 may be used to set a number of properties, such as: "unused", "name", "classname", "arguments", "repeated", and "if". The property "unused" is set by selecting field 502. If this property is set, the class field represents unused data. The reader classes read the data from an input stream, but does not store it or provide any get accessor methods to access it. The "name" property is set in name field 504. This name is used to declare a field within the Java reader class for the parent schema record. In the depicted examples, the field name must be unique within the file schema. If this specified name is not a valid Java field identifier, it is converted into one. Embedded blanks are removed, and invalid characters are converted to "x" characters. The "classname" property is set in class name field 506. The name of the external Java reader class used to read the data for this class field. In the depicted example, this class implements the com.ibm.beans.tools-.dataFormatWizard.LegacyReader interface and should provides get accessor methods to access the data it reads. Any settings needed by this class may be provided in the form of constructor arguments. The "arguments" property is set in arguments field 508. The constructor arguments to be passed to the external Java reader class are set in this field. The property "repeated" is set in repeat field 510. This property determines whether the record is expected to appear once or multiple times within the data stream. In the depicted example, this property may have the following values:

Once

The field is expected to appear exactly once. This is the default.

N Times

The field is expected to appear N times, where N is defined by a Java expression. The expression can use constant values or can refer to the values of other fields in the schema. To refer to values of other fields in a schema, it uses their get accessor methods.

While X

The field is expected to appear an arbitrary number of times while condition X is true. X is defined by a Java expression that can use constant values or can refer to the values of other schema fields. To refer to a value of other schema fields, it uses their get accessor methods.

Until X

The field is expected to appear an arbitrary number of times, but at least once, until condition X is true. X is defined by a Java expression that can use constant values or can refer to the values of other fields. To refer to a value of other schema fields, it uses their get accessor methods.

Until End-Of-Block

The field is expected to appear an arbitrary number of times until the end of the current block is reached. This value is not valid unless this record is contained within another record that defines the block size.

Until End-Of-File

The field is expected to appear an arbitrary number of times until the end of the input stream is reached.

The "if" property is set by selecting "always" field 512 or "if" field 514. This property determines whether a field is always expected to appear in the data stream or only under certain conditions. If the field is not always expected, as indicated by a selection of "if" field 514, a boolean Java expression is entered into field 516, using constants or other schema values, to determine when the field should be expected. By default, the field is expected to appear in the data stream.

Figure 6:
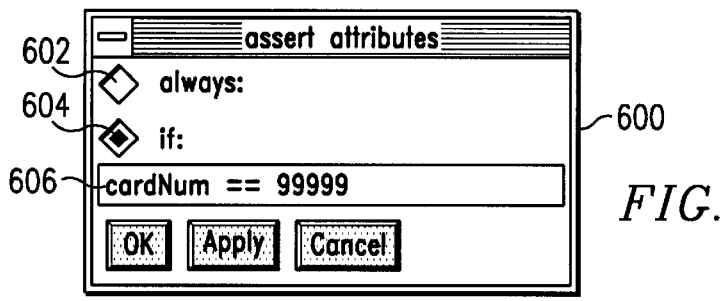
FIG. 6 is an assertion dialog in accordance with a preferred embodiment of the present invention.

With reference now to FIG. 6, an assertion dialog is depicted in accordance with a preferred embodiment of the present invention. An assertion is a schema field that represents a boolean test to be performed on the data while it is being read from the stream. If the test is true; an exception is thrown, and the input stops. An assertion has only the "if" property, which is determined by selecting "always" field 602 or "if" field 604. The "if" property determines whether the assertion should be performed. Selection of "if" field 604, means that a boolean Java expression is to be entered in field 606, using constants or other schema field values. Field 606 is used to determine when this assertion should be performed.

Figure 7:
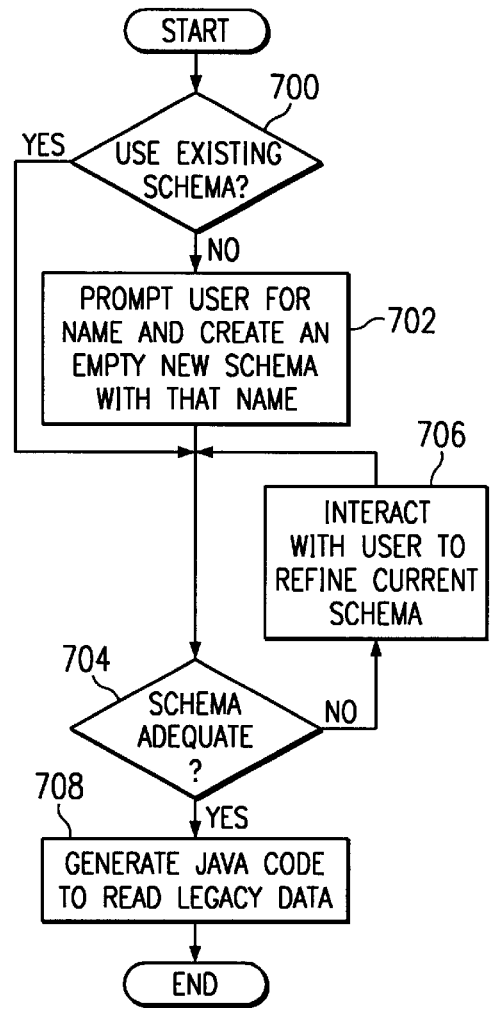
FIG. 7 is a flowchart of a process for generating Java code to read data in accordance with a preferred embodiment of the present invention.

With reference now to FIG. 7, a flowchart of a process for generating Java code to read data is depicted in accordance with a preferred embodiment of the present invention. The process begins by determining whether the existing schema is to be used to read data (step 700). If an existing schema is not to be used, the process interacts with the user to create a new schema, which includes prompting the user to enter a name of the new schema and a description of the structure of the data (step 702). These interactions are made using a GUI such as the one described above. Then, a determination is made as to whether the schema is adequate to describe the legacy data that is to be read (step 704). If the schema is not adequate to describe the data, the process interacts with the user to refine the current schema (step 706) with the process then returning to step 704. When the schema is adequate to describe the data to be read, Java code is generated to read the legacy data (step 708) with the process terminating thereafter. In the depicted example, step 708 generates Java code in the form of a bean of course depending on the implementation other types of Java code may be generated to read the data.

Figure 8:
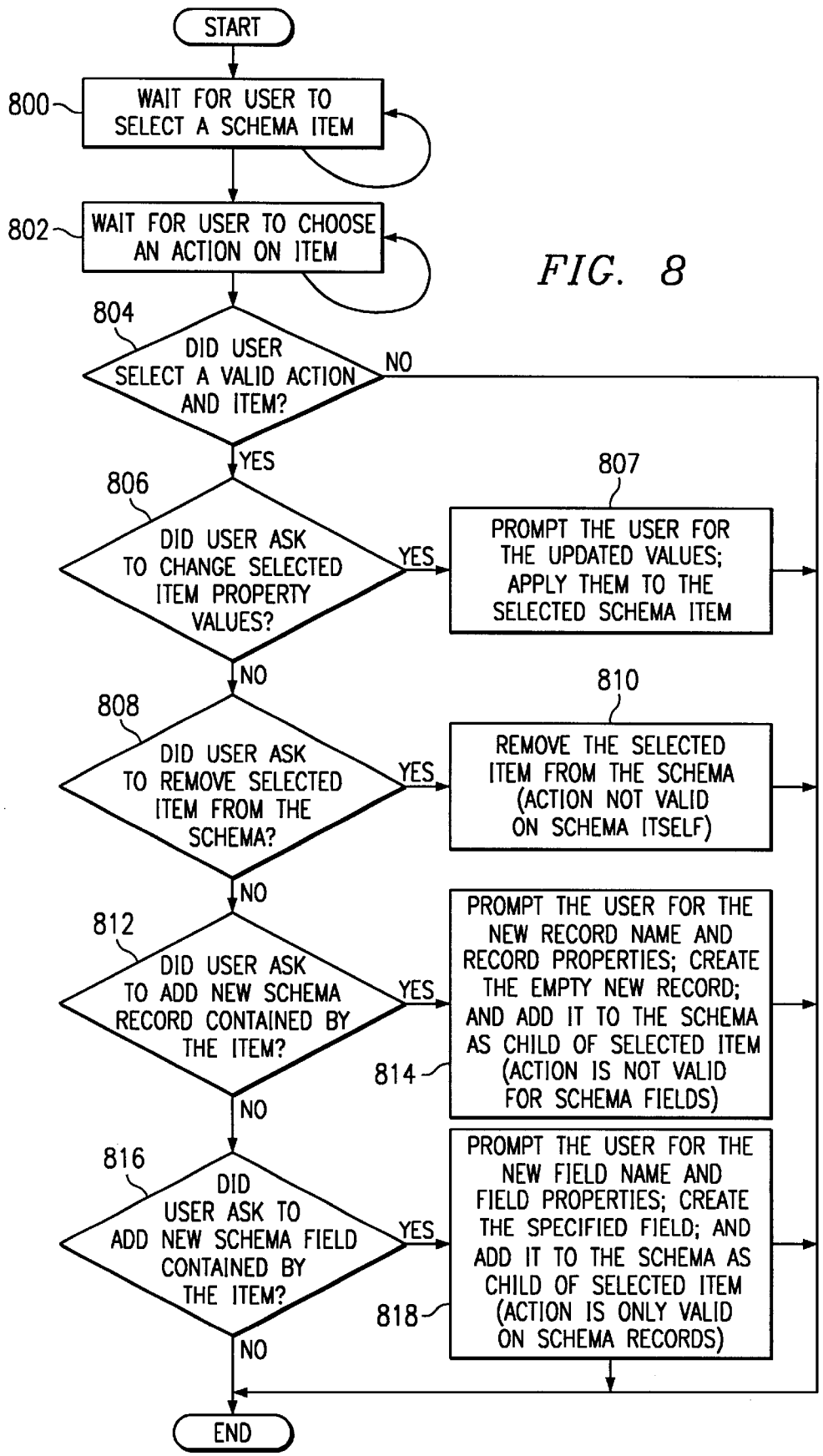
FIG. 8 is a flowchart of a process for interactive editing of the file schema in accordance with a preferred embodiment of the present invention.

Turning next to FIG. 8, a flowchart of a process for interactive editing of the file schema in accordance with a preferred embodiment of the present invention. FIG. 8 is a more detailed description of step 706 in FIG. 7. The process begins by waiting for the user to select a schema item (step 800). A schema item, may be for example, the file schema itself, a schema record, or a schema field, such as a class field, a primitive field, or an assertion. Upon selection of an item by the user, the process waits for the user to choose an action on the item (step 802). When the user chooses an action on the selected item, a determination is made as to whether the user selected a valid action and item (step 804). If a valid action and item has not been selected, the process terminates.

If a valid action and item has been selected, a determination is made as to whether the user asked to change selected item property values (step 806). If the user has asked to change item property values, the process then prompts the user for updated values and applies them to the selected schema item (step 807) with the process terminating thereafter.

With reference again to step 806, if the user did not ask to change selected item property values, a determination is made as to whether the user asked to remove the selected item from the schema (step 808). If the user has asked to remove the item from the file schema, the selected item is removed from the file schema (step 810) with the process terminating thereafter. This action is not valid on the file schema itself. If in step 808, the user did not ask to remove the selected item from the schema, a determination is made as to whether the user asked to add a new schema record contained by the item (step 812). If the answer to this determination is yes, the user is prompted for a new record name and record properties; a new empty record is created; and the record is added to the schema as a child of the selected item (step 814) with the process terminating thereafter. The action in step 814 is not valid for schema fields.

Referring again to step 812, if the answer to the determination is no, a determination is then made as to whether the user asked to add a new schema field contained by the item (step 816). If the user asked to add a new schema field, the user is prompted for the new field name and field properties; the specified filed is created; and the new field is added to the schema as a child of the selected item (step 818) with the process terminating thereafter. This action is only valid on schema records.

Figure 9:
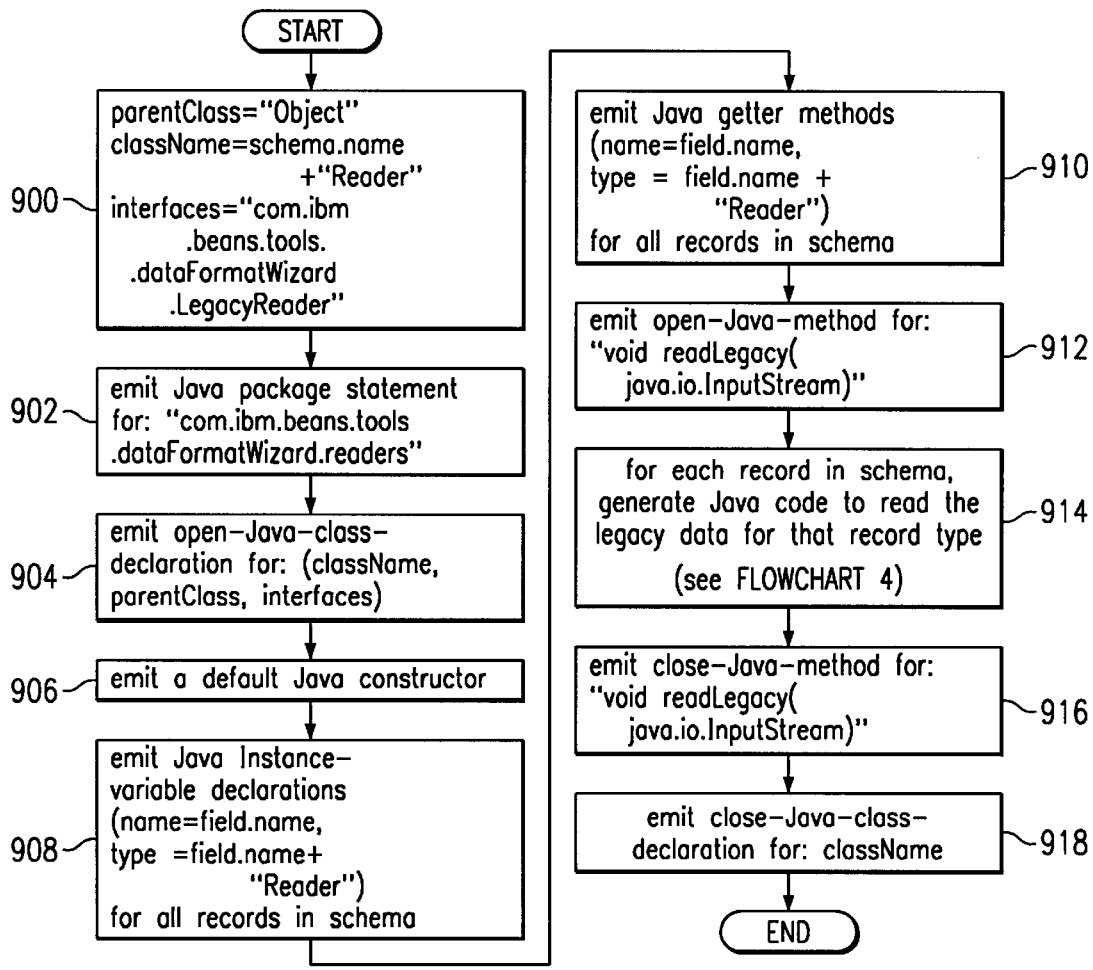
FIG. 9 is a flowchart of a process for generating Java code to read a file schema in accordance with a preferred embodiment of the present invention.

With reference now to FIG. 9, a flowchart of a process for interactive schema editing is depicted in accordance with a preferred embodiment of the present invention. FIG. 9 is a more detailed description of 708 in FIG. 7. The description of the process in FIG. 9 employ features from BeanExtender, which is a builder tool available from International Business Machines Corporation. The process begins by setting parentclass equal to "Object", className equal to schema-.name +"Reader", and interfaces equal to "com.ibm.beans.tools.dataFormat.Wizard.LegacyReader" (step 900). Next, a Java package statement is emitted for: "com.ibm.beans.tools.dataFormatWizard.readers" (step 902). Then an open-Java-class-declaration is emitted for (className, parentclass, interfaces) (step 904). Then, a default Java constructor is emitted (step 906). Java instance-variable declarations (name=field.name, type=field.name+"Reader") are then emitted for all records in the schema (step 908). Java getter methods (name =field.name, type =field.name+"Reader") are emitted for all records in the schema (step 910), and an open-Java method is emitted for "void readLegacy(java.io.InputStream)" (step 912). Then for each record in the schema, Java code is generated to read the legacy data for that record type (step 914). Then, close-Java-method for "void readLegacy (java.io.InputStream)" is emitted (step 916), and closeDocket Java-class-declaration is emitted for className (step 918) with the process terminating thereafter.

Figure 10:
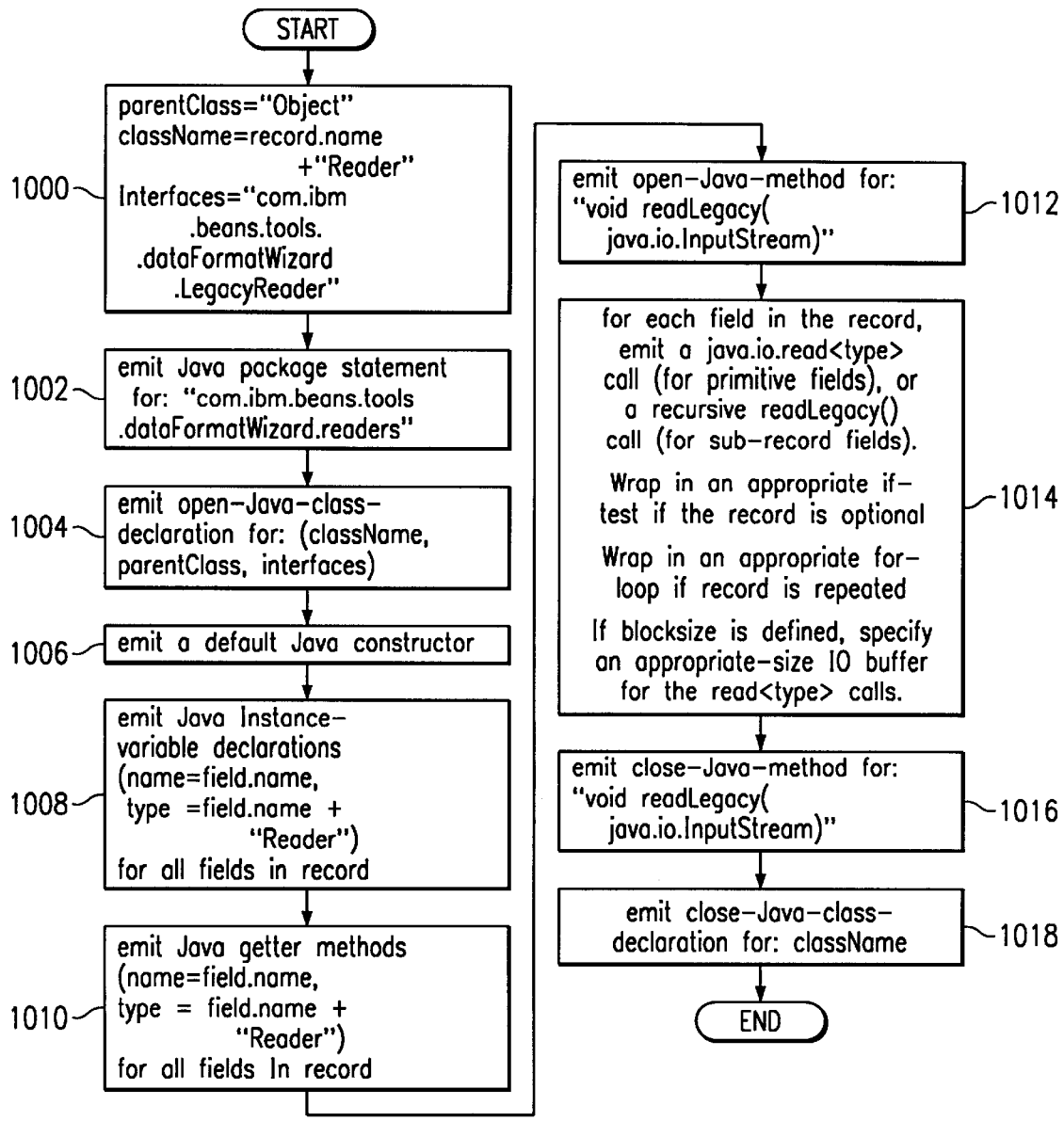
FIG. 10 is a flowchart of a process for generating Java code to read a schema record in accordance with a preferred embodiment of the present invention.

Turning now to FIG. 10, a flowchart of a process for generating Java code to read a schema record is depicted in accordance with a preferred embodiment of the present invention. FIG. 10 is a more detailed description of step 914 in FIG. 9. The process begins by setting parentclass equal to "Object", className equal to record.name +"Reader", and interfaces equal to "com.ibm.beans.tools.dataFormat.Wizard.LegacyReader" (step 1000). Next, a Java package statement is emitted for: "com.ibm.beans.tools.dataFormatWizard.readers" (step 1002). Then an open-Java-class-declaration is emitted for (className, parentclass, interfaces) (step 1004). Then, a default Java constructor is emitted (step 1006). Java instance-variable declarations (name=field.name, type=field.name+"Reader") are then emitted for all records in the record (step 1008). Java getter methods (name=field.name, type=field.name+"Reader") are emitted for all fields in the record (step 1010), and an open-Java method is emitted for "void readLegacy (java.io.InputStream)" (step 1012). Then for each field in the java.io.read<type>call (for primitive fields) or a recursive readLegacy( ) call (for subrecords) is emitted; if the record is optional, an appropriate if-test is wrapped in; if the record is repeated, an appropriate for-loop is wrapped in; and if the block size is defined, an appropriate size I/O buffer for the read <type>calls (step 1014). Then, close-Java-method for "void readLegacy (java.io.InputStream)" is emitted (step 1016), and close-Java-class-declaration is emitted for className (step 1018) with the process terminating thereafter.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, the present invention may be used to generate code to read legacy data for other types of object-oriented systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for reading data having a format, the method comprising the data processing system implemented steps of:

displaying a graphical user interface, wherein the graphical user interface is employed to enter the format of the data to be read;

receiving the format of the data to be read through the graphical user interface, wherein the format indicates an optional record; generating code to read the data using the format of the data and wrapping a Boolean test into the code for the optional record.

2. The method of claim 1 further comprising:

determining whether the format of the data received is sufficient to generate code; and requesting additional information about the format of the data in response to a determination that the format of the data received is insufficient to generate code.

3. The method of claim 1, wherein the code is Java code.

4. The method of claim 3, wherein the Java code is a bean.

5. The method of claim 1, wherein the format of the data is entered into a file schema.

6. The method of claim 5, wherein the file schema includes a plurality of records that describe the format of the data.

7. A data processing system for reading data having a format, the data processing system comprising:

display means for displaying a graphical user interface, wherein the graphical user interface is employed to enter the format of the data to be read;

reception means for receiving the format of the data to be read through the graphical user interface, wherein the format indicates an optional record;

generation means for generating code to read the data using the format of the data, and wrapping means for wrapping a Boolean test into the code for the optional record.

8. The data processing system of claim 7 further comprising:

determination means for determining whether the format of the data is sufficient to generate code; and prompting means for prompting the user for additional information about the format of the data in response to a determination that the format of the data received is insufficient to generate code.

9. The data processing system of claim 7, wherein the code is Java code.

10. The data processing system of claim 9, wherein the Java code is a bean.

11. The data processing system of claim 7, wherein the format of the data is entered into a file schema.

12. The data processing system of claim 11, wherein the file schema includes a plurality of records that describe the format of the data.

13. A computer program product, in a computer readable medium, for reading data having a format, the computer program product comprising:

first instructions for displaying a graphical user interface, wherein a user interacts with the graphical user interface to enter the format of the data to be read;

second instructions for receiving the format of the data to be read through the graphical user interface, wherein the format indicates an optional record;

third instructions for generating code to read the data using the format of the data; and fourth instructions for wrapping a Boolean test into the code for the optional record.

14. The computer program product of claim 13, wherein the computer readable medium is a hard disk drive.

15. The computer program product of claim 13, wherein the computer readable medium is a random access memory.

16. A method in a data processing system for reading data having a format, the method comprising the data processing system implemented steps of:

displaying a graphical user interface, wherein the graphical user interface is employed to enter the format of the data to be read;

receiving the format of the data to be read through the graphical user interface, wherein the format indicates a repeating record;

generating code to read the data using the format of the data; and wrapping a loop into the code for the repeating record.

17. The method of claim 16 further comprising:

determining whether the format of the data received is sufficient to generate code; and requesting additional information about the format of the data in response to a determination that the format of the data received is insufficient to generate code.

18. The method of claim 16, wherein the code is Java code.

19. The method of claim 18, wherein the Java code is a bean.

20. The method of claim 16, wherein the format of the data is entered into a file schema.

21. The method of claim 20, wherein the file schema includes a plurality of records that describe the format of the data.

22. A data processing system for reading data having a format, the data processing system comprising:

display means for displaying a graphical user interface, wherein the graphical user interface is employed to enter the format of the data to be read;

reception means for receiving the format of the data to be read through the graphical user interface, wherein the format indicates a repeating record;

generation means for generating code to read the data using the format of the data; and wrapping means for wrapping a loop into the code for the repeating record.

23. The data processing system of claim 22 further comprising:

determination means for determining whether the format of the data received is sufficient to generate code; and prompting means for prompting the user for additional information about the format of the data in response to a determination that the format of the data received is insufficient to generate code.

24. The data processing system of claim 22, wherein the code is Java code.

25. The data processing system of claim 24, wherein the Java code is a bean.

26. The data processing system of claim 22, wherein the format of the data is entered into a file schema.

27. The data processing system of claim 26, wherein the file schema includes a plurality of records that describe the format of the data.

28. A computer program product, in a computer readable medium, for reading data having a format, the computer program product comprising:

first instructions for displaying a graphical user interface, wherein a user interacts with the graphical user interface to enter the format of the data to be read;

second instructions for receiving the format of the data to be read through the graphical user interface, wherein the format indicates a repeating record;

third instructions for generating code to read the data using the format of the data; and fourth instructions for wrapping a loop into the code for the repeating record.

* * * * *

UNITED STATES PATENT AND TRADEMARK OFFICE
CERTIFICATE OF CORRECTION

PATENT NO.    : 6,252,587 B1
DATED         : June 26, 2001
INVENTOR(S)   : Purple It is certified that error appears in the above-identified patent and that said Letters Patent is hereby corrected as shown below:

<u>Title page,</u>
Inventor, "Lance Jeffery Purple" should read -- Lance Jeffrey Purple --

<u>Column 11,</u>
Line 23, "data," should read -- data; --.

Signed and Sealed this

Twenty-first Day of May, 2002

Attest:

Attesting Officer

JAMES E. ROGAN
Director of the United States Patent and Trademark Office